United States Patent
Luedtke et al.

(10) Patent No.: US 10,336,212 B2
(45) Date of Patent: Jul. 2, 2019

(54) TORQUE MONITORING SYSTEM AND METHOD

(71) Applicant: Ford Global Technologies, LLC, Dearborn, MI (US)

(72) Inventors: Daniel Richard Luedtke, Beverly Hills, MI (US); Fazal Urrahman Syed, Canton, MI (US); Siwei Cheng, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1200 days.

(21) Appl. No.: 14/091,431

(22) Filed: Nov. 27, 2013

(65) Prior Publication Data

US 2015/0149005 A1 May 28, 2015

(51) Int. Cl.
| | |
|---|---|
| *B60L 15/20* | (2006.01) |
| *B60L 3/12* | (2006.01) |
| *H02P 21/20* | (2016.01) |
| *B60L 50/61* | (2019.01) |
| *B60L 50/16* | (2019.01) |
| *B60L 58/30* | (2019.01) |

(52) U.S. Cl.
CPC ............... *B60L 15/20* (2013.01); *B60L 3/12* (2013.01); *B60L 50/16* (2019.02); *B60L 50/61* (2019.02); *B60L 58/30* (2019.02); *H02P 21/20* (2016.02); *B60L 2240/423* (2013.01); *B60L 2240/427* (2013.01); *B60L 2240/429* (2013.01); *B60L 2260/44* (2013.01); *Y02T 10/6217* (2013.01); *Y02T 10/643* (2013.01); *Y02T 10/645* (2013.01); *Y02T 10/7005* (2013.01); *Y02T 10/7077* (2013.01); *Y02T 10/72* (2013.01); *Y02T 10/7275* (2013.01); *Y02T 90/34* (2013.01); *Y10S 903/903* (2013.01)

(58) Field of Classification Search
None
See application file for complete search history.

(56) References Cited

U.S. PATENT DOCUMENTS

| | | | | |
|---|---|---|---|---|
| 4,041,361 A | * | 8/1977 | Cornell | H02P 23/08 318/802 |
| 5,357,181 A | | 10/1994 | Mutoh et al. | |
| 5,568,023 A | * | 10/1996 | Grayer | B60K 6/30 318/139 |
| 5,670,854 A | * | 9/1997 | Matsuura | B62D 5/046 318/432 |
| 6,509,711 B1 | | 1/2003 | Zaremba | |

(Continued)

FOREIGN PATENT DOCUMENTS

CN 103197565 A 7/2013

OTHER PUBLICATIONS

"Direct Torque Control of an Induction Motor Using a Single Current Sensor," by: Manuele Bertoluzzo, et al., IEEE Transactions on Industrial Electronics, vol. 53, No. 3, Jun. 2006, pp. 778-784.

*Primary Examiner* — Shelley Chen
(74) *Attorney, Agent, or Firm* — Carlson, Gaskey & Olds

(57) ABSTRACT

A method according to an exemplary aspect of the present disclosure includes, among other things, controlling a vehicle using an estimated torque of an electric machine, the estimated torque based on one or more parameters associated with the electric machine that are independent from measured current feedback.

24 Claims, 3 Drawing Sheets

(56) References Cited

U.S. PATENT DOCUMENTS

| | | | |
|---|---|---|---|
| 6,636,008 B2* | 10/2003 | Yamada | H02P 21/22 318/400.02 |
| 6,777,906 B1* | 8/2004 | Kinpara | H02P 21/04 318/727 |
| 7,116,077 B2 | 10/2006 | Raftari et al. | |
| 7,276,877 B2 | 10/2007 | Qiu et al. | |
| 7,755,310 B2 | 7/2010 | West et al. | |
| 7,970,523 B2 | 6/2011 | Wallis et al. | |
| 8,080,956 B2 | 12/2011 | Wu | |
| 2001/0048226 A1* | 12/2001 | Nada | F02N 11/0859 290/400 |
| 2002/0043945 A1* | 4/2002 | Omata | B60K 6/485 318/139 |
| 2003/0085678 A1* | 5/2003 | Yamada | H02P 21/22 318/400.02 |
| 2004/0195993 A1* | 10/2004 | Yoshimoto | H02P 21/06 318/802 |
| 2006/0087268 A1* | 4/2006 | Joel | B60K 6/365 318/432 |
| 2007/0085511 A1* | 4/2007 | Uematsu | H02P 9/48 322/28 |
| 2008/0258656 A1* | 10/2008 | Kawasaki | B60K 6/445 318/148 |
| 2008/0281480 A1* | 11/2008 | Egami | B60K 6/445 701/22 |
| 2009/0167222 A1* | 7/2009 | Blind | B60W 40/109 318/400.15 |
| 2012/0146559 A1 | 6/2012 | Johansson | |
| 2012/0280644 A1* | 11/2012 | Lind | H02P 29/027 318/476 |
| 2012/0303196 A1 | 11/2012 | Kieser et al. | |
| 2013/0113398 A1 | 5/2013 | Kato et al. | |
| 2013/0175965 A1* | 7/2013 | Fuchs | G01L 3/00 318/490 |
| 2013/0184966 A1 | 7/2013 | Lockwood et al. | |
| 2013/0214711 A1 | 8/2013 | Omata et al. | |
| 2014/0379191 A1* | 12/2014 | Hayashi | B60K 6/485 701/22 |

* cited by examiner

TORQUE MONITORING SYSTEM AND METHOD

TECHNICAL FIELD

This disclosure relates to an electrified vehicle, and more particularly, but not exclusively, to a torque monitoring system and method for estimating electric machine torque without measuring current feedback.

BACKGROUND

Hybrid electric vehicles (HEV's), plug-in hybrid electric vehicles (PHEV's), battery electric vehicles (BEV's), fuel cell vehicles and other known electrified vehicles differ from conventional motor vehicles in that they are powered by one or more electric machines (i.e., electric motors and/or generators) instead of or in addition to an internal combustion engine. High voltage current is typically supplied to the electric machines by one or more batteries that store electrical power.

Electric machines may incorporate synchronous motors having a stator that generally surrounds a rotor that includes interior permanent magnets. Each phase winding of the electric machine may be monitored by a current sensor that directly measures currents of the electric machine. These measured currents may then be utilized to detect inaccurate electric machine torque, such as to avoid unintended vehicle motion. However, current sensors add cost and weight and can be prone to sensor failure. Additional advancements in this field of technology are therefore desirable.

SUMMARY

A method according to an exemplary aspect of the present disclosure includes, among other things, controlling a vehicle using an estimated torque of an electric machine, the estimated torque based on one or more parameters associated with the electric machine that are independent from measured current feedback.

In a further non-limiting embodiment of the foregoing method, the method includes comparing the estimated torque to an expected torque.

In a further non-limiting embodiment of either of the foregoing methods, the method of controlling the vehicle includes preventing operation of the vehicle if a difference between the estimated torque and the expected torque exceeds a predefined threshold.

In a further non-limiting embodiment of any of the foregoing methods, the method of controlling the vehicle includes limiting operation of the vehicle if a difference between the estimated torque and the expected torque error exceeds a predefined threshold.

In a further non-limiting embodiment of any of the foregoing methods, the one or more parameters include voltages.

In a further non-limiting embodiment of any of the foregoing methods, the one or more parameters include inductances.

In a further non-limiting embodiment of any of the foregoing methods, the one or more parameters include physical flux linkages.

In a further non-limiting embodiment of any of the foregoing methods, the one or more parameters include resistances.

In a further non-limiting embodiment of any of the foregoing methods, the one or more parameters include measured voltages of the electric machine.

In a further non-limiting embodiment of any of the foregoing methods, the estimated torque is derived using the following equation:

$$T_{em} = \frac{3N_{pp}}{2} I_q (\lambda_m - (L_q - L_d)I_d)$$

where:
$N_{pp}$ is the number of pole-pairs,
$I_q$ and $I_d$ are the q-axis and d-axis currents, respectively,
$\lambda_m$ is the permanent magnet flux linkage, and
$L_q$ and $L_d$ are the q-axis and d-axis inductances, respectively.

A method according to another exemplary aspect of the present disclosure includes, among other things, controlling a vehicle using an estimated torque of an electric machine, the estimated torque derived without measuring current feedback from the electric machine.

In a further non-limiting embodiment of the foregoing method, the estimated torque is derived from at least one of inductance estimates, voltage estimates, resistance estimates and physical flux linkage estimates associated with the electric machine.

In a further non-limiting embodiment of either of the foregoing methods, the method includes calculating the estimated torque of the electric machine, comparing the estimated torque to an expected torque and performing the controlling step in response to a difference between the estimated torque and the expected torque exceeding a predefined threshold.

In a further non-limiting embodiment of any of the foregoing methods, the method of performing the controlling step includes preventing operation of the vehicle.

In a further non-limiting embodiment of any of the foregoing methods, the method of performing the controlling step includes limiting operation of the vehicle.

A torque monitoring system according to another exemplary aspect of the present disclosure includes, among other things, an electric machine and a control unit configured to estimate a torque of the electric machine without measuring current feedback from the electric machine.

In a further non-limiting embodiment of the foregoing system, the control unit is configured to estimate the torque based on at least one of inductance estimates, voltage estimates, resistance estimates and physical flux linkage estimates associated with the electric machine.

In a further non-limiting embodiment of either of the foregoing systems, a variable voltage converter is in communication with the control unit.

In a further non-limiting embodiment of any of the foregoing systems, an inverter is connected to the electric machine by a plurality of windings.

In a further non-limiting embodiment of any of the foregoing systems, the control unit employs the following torque equation to derive the torque:

$$T_{em} = \frac{3N_{pp}}{2} I_q (\lambda_m - (L_q - L_d)I_d)$$

where:
$N_{pp}$ is the number of pole-pairs,
$I_q$ and $I_d$ are the q-axis and d-axis currents, respectively, $\lambda_m$ is the permanent magnet flux linkage, and
$L_q$ and $L_d$ are the q-axis and d-axis inductances, respectively.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a torque monitoring system and method for estimating the torque of an electric machine of a vehicle. The inventive torque monitoring system estimates an electric machine torque based on various estimated parameters but does not rely on measured current feedback from the electric machine. Accordingly, one or more current sensors may be eliminated from the system. These and other features are discussed in greater detail herein.

Figure 1:
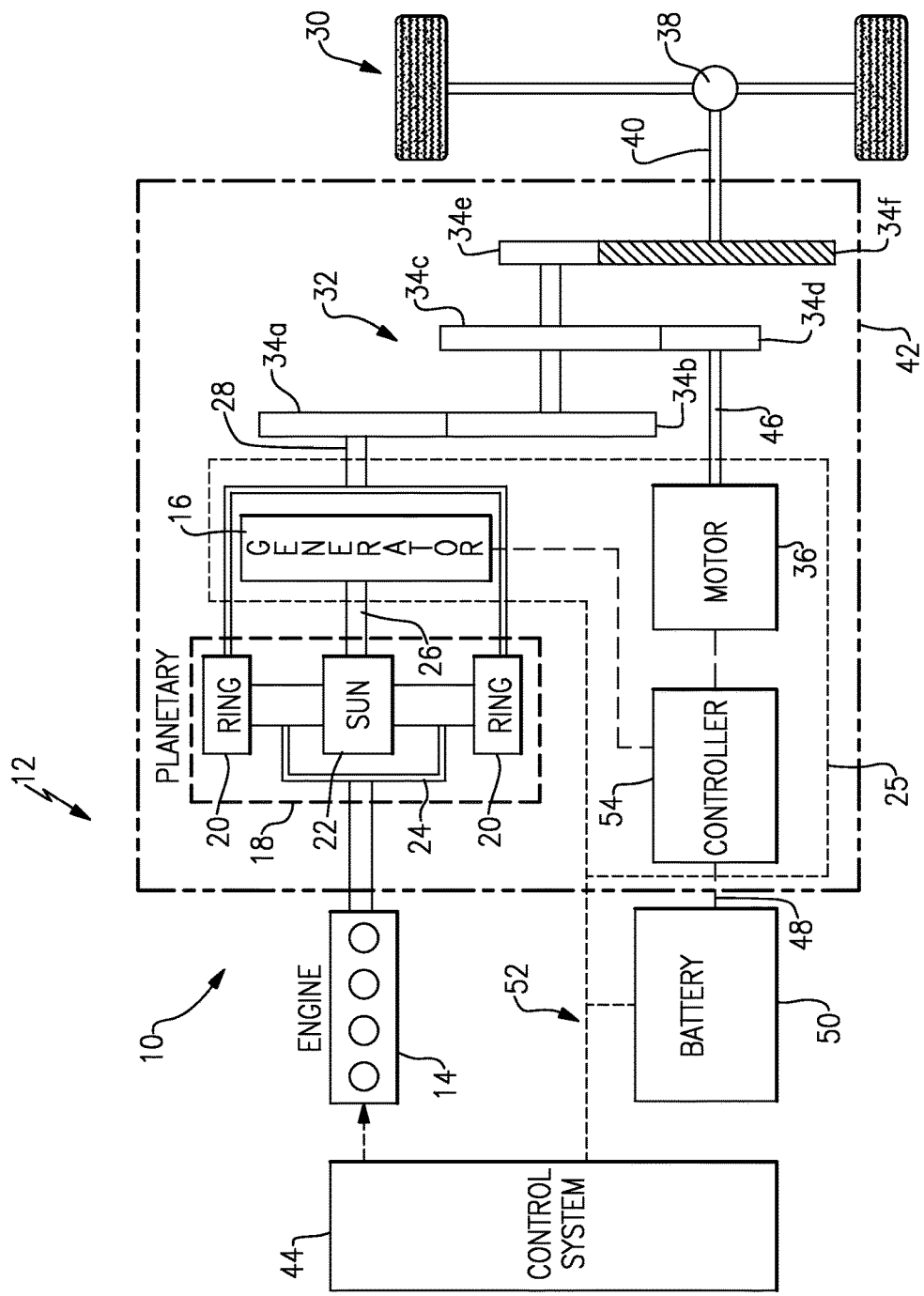
FIG. 1 schematically illustrates a powertrain of an electrified vehicle.

FIG. 1 schematically illustrates a powertrain 10 for an electrified vehicle 12, such as a HEV. Although depicted as a HEV, it should be understood that the concepts described herein are not limited to HEV's and could extend to other electrified vehicles, including but not limited to, PHEV's, BEV's, and fuel cell vehicles.

In one embodiment, the powertrain 10 is a power split system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50. The battery 50 may be a high voltage battery that is capable of outputting electrical power to operate the motor 36 and the generator 16. Other types of energy storage devices and/or output devices can also be incorporated for use with the electrified vehicle 12.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 could also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

Figure 2:
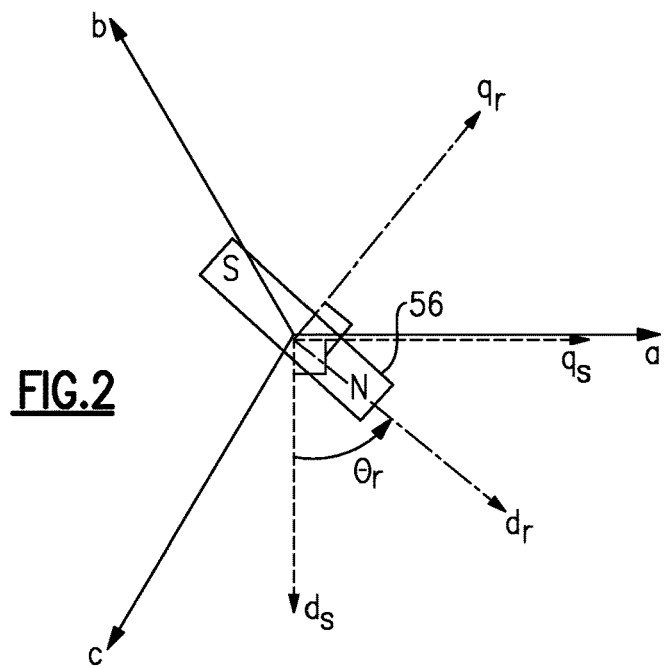
FIG. 2 illustrates a mathematical model of an electric machine rotor relative to a direct axis and a quadrature axis.

Referring to FIG. 2, electric machines such as the generator 16 and the motor 36 of FIG. 1 may include a rotor 56 (which may be connected to a shaft) that rotates to generate torque for powering the vehicle drive wheels 30 of the electrified vehicle 12 of FIG. 1. The rotor 56 can be mathematically represented relative to a three phase stationary frame a, b and c. The three-phase stationary frame a, b and c may be represented in two-dimensionally via a stationary d, q frame and a rotating d, q frame. For example, the stationary d, q frame includes a direct axis $d_s$ and a quadrature axis $q_s$, and the rotating d, q frame includes a direct axis $d_r$ and a quadrature axis $q_r$. The rotating d, q frame is aligned with movement of the rotor 56. $\theta_r$ represents an angular positioning of the rotor 56 and extends between the direct axes $d_r$, $d_s$. It may become necessary during operation of the electrified vehicle 12 to estimate the operating torque of the electric machine 16, 36 in order to meet electric control requirements and to avoid inaccurate torque production, which can lead to unintended vehicle motion.

Figure 3:
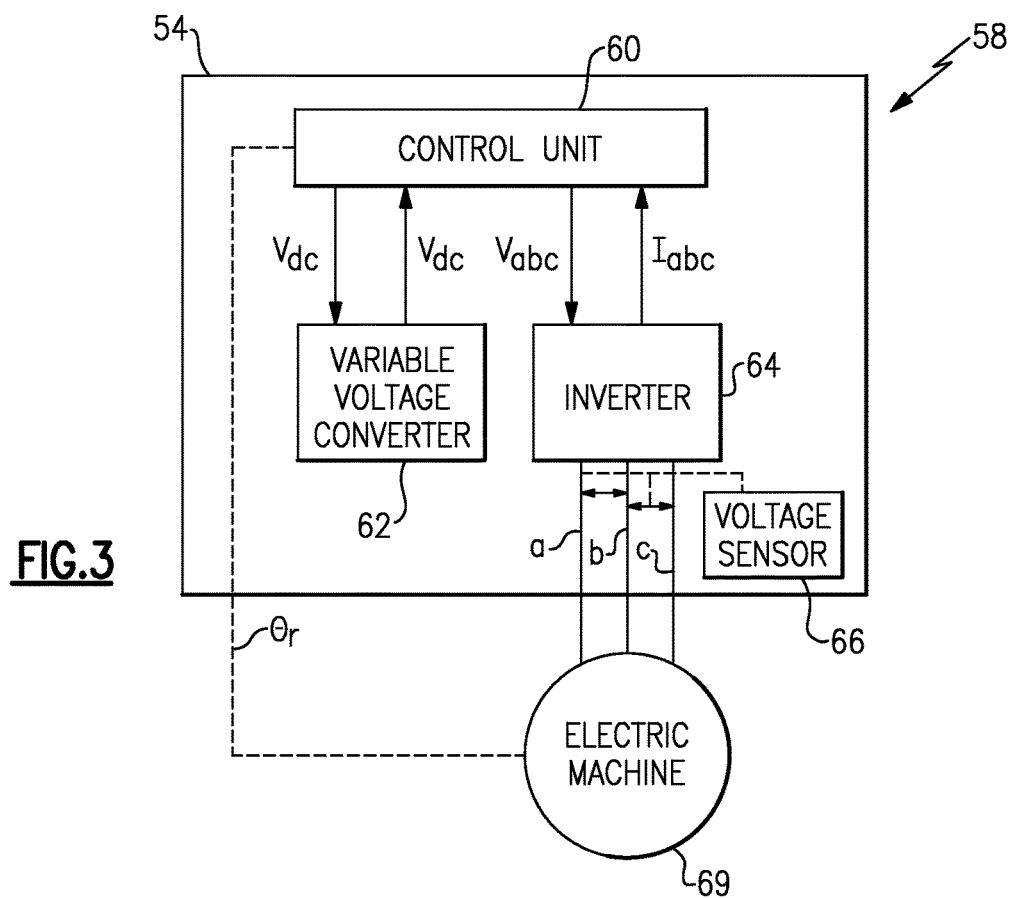
FIG. 3 illustrates a torque monitoring system.

FIG. 3 illustrates a torque monitoring system 58 that can be incorporated into a vehicle, such as the electrified vehicle 12 of FIG. 1. The torque monitoring system 58 estimates a torque of an electric machine 69 (i.e., the motor 36 and/or generator 16 of FIG. 1). As discussed in greater detail below, the torque monitoring system 58 is operable to estimate torque without relying on current feedback from the electric machine 69.

In one embodiment, the torque monitoring system 58 includes a control unit 60, a variable voltage converter 62 and an inverter 64. The control unit 60, the variable voltage converter 62 and the inverter 64 may be part of the controller 54. Alternatively, these components could be separate from the controller 54.

The torque monitoring system 58 may employ one or more algorithms programmed into the control unit 60 in order to apply special voltage commands and use special processing of the feedback signals to perform multiple tasks related to operation of the electric machine 69, including estimating a torque of the electric machine 69. For example, the control unit 60 may control three phase alternating current in the electric machine 69 by commanding three phase voltages $V_{abc}$ to the inverter 64 and measuring the three phase current $I_{abc}$ and rotor position $\theta_r$ as feedback from the inverter 64 and the electric machine 69, respectively. The variable voltage converter 62 may be used to convert a control signal to an appropriate voltage level for controlling the inverter 64, in one embodiment.

The torque monitoring system 58 can optionally include a voltage sensor 66. The voltage sensor 66 is configured to measure a voltage across one or more of the windings a, b and c that extend between the inverter 64 and the electric machine 69. In one embodiment, the windings a, b and c are connected in a "wye" configuration, although other configurations are also contemplated.

In one non-limiting embodiment, the torque of the electric machine 69 may be estimated using a plurality of parameters of the electric machine 69 that are independent from measured current feedback from the electric machine 69. The parameters used to estimate the torque of the electric machine 69 may include any one or more of the following parameters: estimated or measured voltages, inductances, physical flux linkages, and resistances.

In one embodiment, equations (1) through (6), which are described below, may be programmed into the control unit 60 of the torque monitoring system 58 for estimating the torque of the electric machine 69. The equations (1) through (6) may be used to estimate various parameters for deriving the torque.

For example, a torque $T_{em}$ of the electric machine 69 may be characterized by the following equation:

$$T_{em} = \frac{3N_{pp}}{2} I_q (\lambda_m - (L_q - L_d) I_d) \quad (1)$$

where:
$N_{pp}$ is the number of pole-pairs,
$I_q$ and $I_d$ are the q-axis and d-axis currents, respectively,
$\lambda_m$ is the permanent magnet flux linkage (in Weber-turns), and
$L_q$ and $L_d$ are the q-axis and d-axis inductances (in Henrys), respectively.

Voltages $V_d$ and $V_q$ of the electric machine 69 may be characterized by the following equations:

$$V_d = I_d R_s - I_q L_q \omega_{re} \quad (2)$$

$$V_q = I_q R_s + (\lambda_m + I_d L_d) \omega_{re} \quad (3)$$

where:
$V_d$ and $V_q$ are the d-axis and q-axis voltages, respectively,
$R_s$ is the physical stator phase resistance, and
$\omega_{re}$ is the rotor electrical angular velocity.

Because of core saturation of the electric machine 69, the physical inductance estimates $L_d$ and $L_q$ may be operating point dependent. Therefore, in one embodiment, the inductance estimates $L_d$ and $L_q$ are mapped as a function of the $I_d/I_q$ currents and may be based on measured calibration data of the electric machine 69.

In one embodiment, the voltage estimates $V_d$ and $V_q$ can be estimated accurately based on the commanded voltages $V_{abc}$ communicated from the control unit 60 while compensating for any non-linearities of the inverter 64. For example, inverter 64 non-linearities can cause the true output voltage to be different from what was commanded and may include PWM dead-time, which is intentionally introduced delay between turn-off and turn-on of complementary switches on the same inverter leg, and switch collector-emitter voltage drop and diode voltage drop. The impact of these voltage drops on the output voltage depends on direction and magnitude of the phase current in each leg of the inverter 64. Alternatively, the voltage estimates $V_d$, $V_q$ can be measured using the voltage sensor 66 described in FIG. 3.

In another embodiment, the physical resistance estimates $R_s$ are based on stator temperatures of the electric machine 69. The physical flux linkage $\lambda_m$ may be estimated from a temperature of a permanent magnet of the rotor of the electric machine, in one embodiment. Finally, the rotor electrical angular velocity $\omega_{re}$ may be calculated from a measured position signal of the rotor of the electric machine 69, such as by using a resolver or other sensor.

The above equations (1), (2) and (3) can be manipulated to model the torque of the electric machine 69 without relying on measured currents. First, solving voltage equations (2) and (3) in order to estimate the $I_d/I_q$ currents yields the following equations:

$$\hat{I}_d = \frac{\hat{V}_d + (\hat{V}_q - \hat{\lambda}_m \omega_{re}) C_1}{\hat{R}_s + \hat{L}_d \omega_{re} C_1} \quad (4)$$

$$\hat{I}_q = \frac{\hat{V}_q - (\hat{V}\hat{\lambda}_m + \hat{I}_d L_d)\omega_{re}}{\hat{R}_s} \quad (5)$$

where:

$$C_1 = \frac{\hat{L}_q \omega_{re}}{\hat{R}_s}$$

Then, the torque of the electric machine 69 can be estimated using the following torque equation, which follows from equation (1):

$$\hat{T}_{em} = \frac{3N_{pp}}{2}\hat{I}_q(\hat{\lambda}_m - (\hat{L}_q - \hat{L}_d)\hat{I}_d) \quad (6)$$

Figure 4:
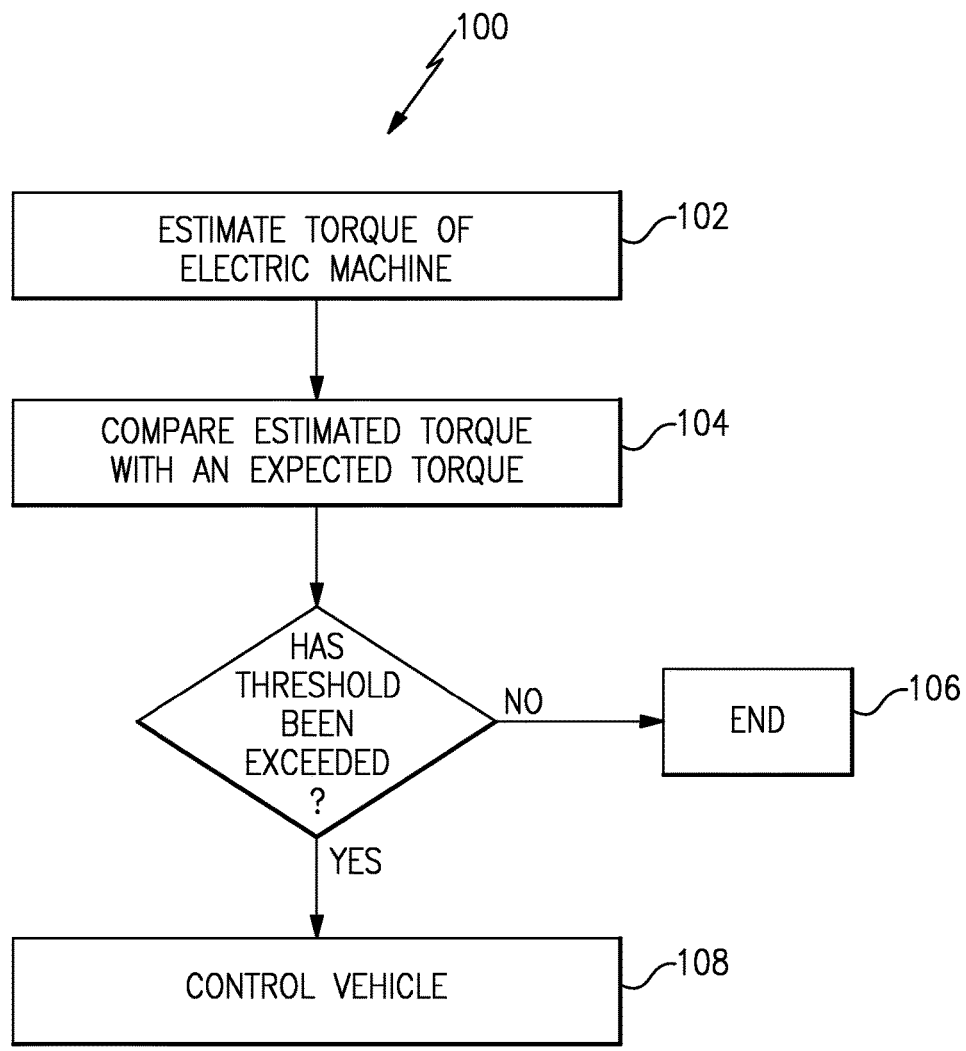
FIG. 4 schematically illustrates a method for estimating the torque of an electric machine using the torque monitoring system of FIG. 3.

FIG. 4, with continued reference to FIGS. 1-3, schematically illustrates a method 100 for estimating the torque of an electric machine 69. At block 102, the method 100 estimates an operating torque of an electric machine 69 using the torque monitoring system 58. The torque estimate may be based on one or more parameters associated with the electric machine 69, including but not limited to, estimated or measured voltages, inductances, physical flux linkages, and resistances. The method 100; however, does not rely on measured current feedback. In other words, the torque is estimated independently from any measured current feedback from the electric machine 69. This may permit the elimination of one or more current sensors for monitoring the windings a, b and c that connect the inverter 64 to the electric machine 69 (see FIG. 3).

Next, at block 104, the estimated torque from block 102 is compared to an expected torque. The expected torque may be stored in the control unit 60 of the torque monitoring system 58 and represents the torque value required to appropriately control and operate the electric machine 69 for any given condition. In one non-limiting embodiment, during block 104, the expected torque and the estimated torque are compared in order to determine whether a difference between these two values exceeds a predefined threshold. The predefined threshold could be defined in terms of an error percentage or by any other threshold. Exceeding the predefined threshold indicates incorrect electric machine 69 torque.

The method 100 ends (or, alternatively, starts again at block 102) at block 106 if the difference between the estimated torque and the expected torque do not exceed the predefined threshold. Alternatively, the method 100 may proceed to block 108 if the control unit 60 determines that the difference between the estimated torque and the expected torque exceeds the predefined threshold.

The electrified vehicle 12 (or some other vehicle) may be controlled in some manner at block 108 in response to detecting incorrect electric machine 69 torque. For example, in one embodiment, controlling the vehicle at block 108 includes preventing operation of the vehicle until it can be serviced. In another embodiment, controlling the vehicle at block 108 includes limiting operation of the vehicle. Other manners of controlling the vehicle in response to the detection of incorrect electric machine 69 torque are also contemplated within the scope of this disclosure.

The proposed method 100 provides a relatively straightforward determination of an error threshold associated with the electric machine 69 torque generation. The proposed solution works even at zero speed, which is typically a critical operating point of the electric machine 69. The method 100 may also be incorporated without the necessity for multiple current sensors, thereby reducing cost, weight and space.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling a vehicle using an estimated torque of an electric machine, the estimated torque based on one or more parameters associated with the electric machine that are independent from measured current feedback, wherein the one or more parameters include measured voltages of the electric machine.

2. The method as recited in claim 1, comprising the step of comparing the estimated torque to an expected torque.

3. The method as recited in claim 2, wherein the step of controlling the vehicle includes preventing operation of the vehicle if a difference between the estimated torque and the expected torque exceeds a predefined threshold.

4. The method as recited in claim 2, wherein the step of controlling the vehicle includes limiting operation of the vehicle if a difference between the estimated torque and the expected torque error exceeds a predefined threshold.

5. The method as recited in claim 1, wherein the one or more parameters include estimated voltages.

6. The method as recited in claim 1, wherein the one or more parameters include inductances.

7. The method as recited in claim 1, wherein the one or more parameters include physical flux linkages.

8. The method as recited in claim 1, wherein the one or more parameters include resistances.

9. The method as recited in claim 1, wherein the estimated torque is derived using the following equation:

$$T_{em} = \frac{3N_{pp}}{2} I_q(\lambda_m - (L_q - L_d)I_d)$$

where:
$N_{pp}$ is the number of pole-pairs,
$I_q$ and $I_d$ are the q-axis and d-axis currents, respectively,
$\lambda_m$ is the permanent magnet flux linkage, and
$L_q$ and $L_d$ are the q-axis and d-axis inductances, respectively.

10. A method, comprising:
controlling a vehicle using an estimated torque of an electric machine, the estimated torque derived without measuring current feedback from the electric machine.

11. The method as recited in claim 10, wherein the estimated torque is derived from at least one of inductance estimates, voltage estimates, resistance estimates and physical flux linkage estimates associated with the electric machine.

12. The method as recited in claim 10, comprising:
calculating the estimated torque of the electric machine;
comparing the estimated torque to an expected torque; and
performing the controlling step in response to a difference between the estimated torque and the expected torque exceeding a predefined threshold.

13. The method as recited in claim 12, wherein the step of performing the controlling step includes preventing operation of the vehicle.

14. The method as recited in claim 12, wherein the step of performing the controlling step includes limiting operation of the vehicle.

15. A torque monitoring system, comprising:
an electric machine; and
a control unit configured to estimate a torque of said electric machine without measuring current feedback from said electric machine.

16. The system as recited in claim 15, wherein said control unit is configured to estimate said torque based on at least one of inductance estimates, voltage estimates, resistance estimates and physical flux linkage estimates associated with said electric machine.

17. The system as recited in claim 15, comprising a variable voltage converter in communication with said control unit.

18. The system as recited in claim 15, comprising an inverter connected to said electric machine by a plurality of windings.

19. The system as recited in claim 15, wherein said control unit employs the following torque equation to derive said torque:

$$T_{em} = \frac{3N_{pp}}{2} I_q (\lambda_m - (L_q - L_d) I_d)$$

where:
$N_{pp}$ is the number of pole-pairs,
$I_q$ and $I_d$ are the q-axis and d-axis currents, respectively,
$\lambda_m$ is the permanent magnet flux linkage, and
$L_q$ and $L_d$ are the q-axis and d-axis inductances, respectively.

20. The system as recited in claim 15, comprising:
an inverter;
a plurality of windings extending between said inverter and said electric machine; and
a voltage sensor configured to measure a voltage across one or more of said plurality of windings.

21. The method as recited in claim 1, wherein the one or more parameters include physical resistance estimates that are based on stator temperatures of the electric machine.

22. The method as recited in claim 1, wherein the one or more parameters include physical flux linkages that are estimated from a temperature of a permanent magnet of a rotor of the electric machine.

23. The method as recited in claim 1, wherein the one or more parameters include inductance estimates mapped as a function of a q-axis current and a d-axis current.

24. The method as recited in claim 1, wherein the one or more parameters include inductances, physical flux linkages, and resistances associated with the electric machine.

* * * * *